United States Patent [19]

Burdick et al.

[11] Patent Number: 4,785,350
[45] Date of Patent: Nov. 15, 1988

[54] TV INPUT SOURCE IDENTIFIER

[75] Inventors: William Burdick, Rutledge; J. Peter Bingham, Knoxville, both of Tenn.

[73] Assignee: North American Philips Consumer Electronics Corp., New York, N.Y.

[21] Appl. No.: 119,603

[22] Filed: Nov. 12, 1987

[51] Int. Cl.$^4$ .................. H04N 5/44; H04N 17/04
[52] U.S. Cl. .................................. 358/139; 358/10; 358/148; 358/188
[58] Field of Search .................. 358/139, 10, 188, 148

[56] References Cited

U.S. PATENT DOCUMENTS

| | | | |
|---|---|---|---|
| 3,994,019 | 11/1976 | Sagishima | 360/33 |
| 4,051,526 | 9/1977 | Steinkopf | 358/127 |
| 4,112,445 | 9/1978 | Steinkopf | 358/127 |
| 4,158,857 | 6/1979 | Hiraguri | 358/148 |
| 4,364,094 | 12/1982 | French | 358/139 |
| 4,398,220 | 8/1983 | Satoh | 358/188 |
| 4,489,343 | 12/1984 | Hosoya | 358/188 |
| 4,535,353 | 8/1985 | Turner | 358/139 |
| 4,684,988 | 8/1987 | Johannes | 358/154 |
| 4,729,023 | 3/1988 | Sriuastaua | 358/148 |

Primary Examiner—Howard W. Britton
Attorney, Agent, or Firm—Thomas A. Briody; Algy Tamoshunas; Marianne R. Rich

[57] ABSTRACT

The disclosed circuit determines whether a video signal is from a video tape player or a broadcast signal source by measuring jitter of the vertical synchronization pulses. In one embodiment, every other time interval between the vertical synchronization pulses is measured and saved as a count, and each count is compared to the preceding count to determine whether sufficient jitter is present to indicate that the video signal is from a local tape player. In another embodiment all intervals between the vertical synchronization pulses are measured and a predetermined number thereof are saved as counts. The even and odd counts are then analyzed separately, and the extreme count (the most deviant count) of each group is eliminated. With the extremes eliminated, the overall deviation of the counts from an average is determined for each group (even and odd) and such deviations are compared to predetermined data (a threshold) to decide whether jitter is sufficiently large to indicate that the source of the video signal is a local tape player.

10 Claims, 2 Drawing Sheets

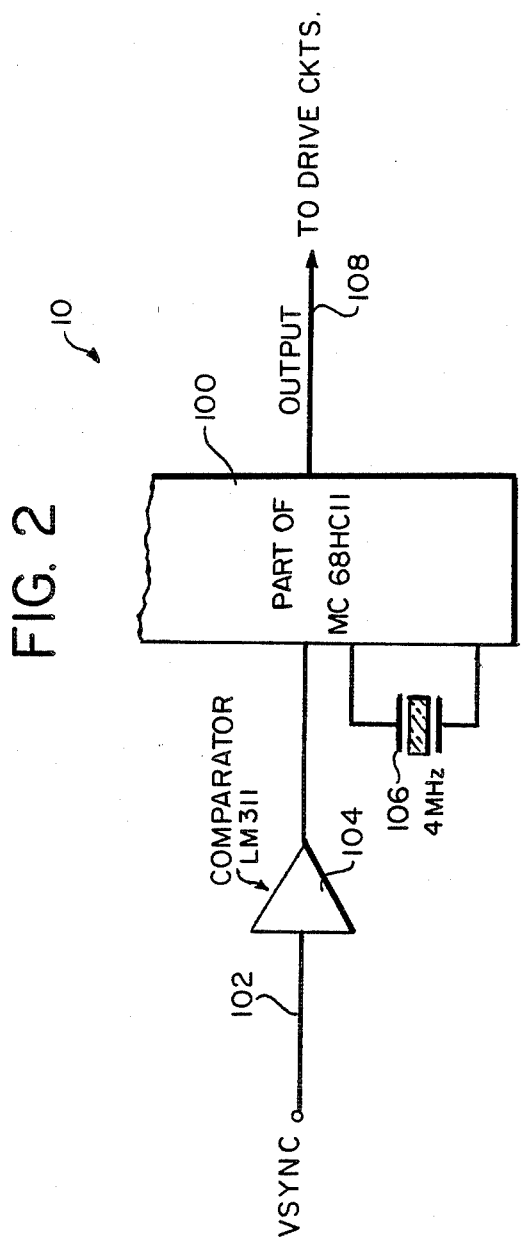

TV INPUT SOURCE IDENTIFIER

FIELD OF INVENTION

The present invention relates to circuits that determine the type of video signal source and particularly relates to a circuit that detects jitter to determine whether a video signal source is a local tape player.

BACKGROUND OF THE INVENTION

A typical home television system often includes a video cassette recorder/player (VCR) and a television, and the broadcast signal is usually an input to the VCR. The VCR output is then applied as an input to the television. When the VCR is not playing, the broadcast signal is transmitted by the VCR to the television so that the television receives both the broadcast signal and a local recorded signal from the same source, the VCR. It is desirable to create a display on the television to indicate whether the video source is a tape or a broadcast signal, but such information is not commonly available at the television. If a viewer is switching back and forth between a live broadcast and a tape, perhaps viewing the tape during commercials, he may forget which source he is watching. It would then be helpful to him for the television to display the identity of the source that he is watching. Such source information might also be useful to enhance the function of other circuits in the television. Thus, a need exists for a circuit that will analyze the input signal to a television and determine the type of signal source—either a local tape player or broadcast signal.

SUMMARY OF THE INVENTION

It has been determined that a video signal from a home VCR may be identified and distinguished from a broadcast signal by monitoring jitter and particularly by monitoring jitter on the vertical synchronization pulses of the video signal. It has further been determined that jitter for this purpose is reliably determined by comparing every other time interval between the video synchronization pulses. It is best to compare every other time interval since each television picture includes two interlaced fields that alternate in time sequence and, by comparing every other time interval, one is comparing the time interval of the same field in different picture frames.

In accordance with one embodiment of the invention, a clock provides clock pulses to a counter, and the vertical synchronization signal is applied to a flip-flop. The counter is controlled by the flip-flop to count the clock pulses beginning with the first vertical synchronization pulse and ending with the second vertical synchronization pulse. The counter is cleared at the instance of the second vertical synchronization pulse and it remains clear until the third vertical synchronization pulse appears. At the advent of the third vertical synchronization pulse the counter again counts until the advent of the fourth signal, and so on. Thus, the counts correspond in magnitude to every other time interval between the video synchronization pulses. The counts are alternately applied to one of two latches whose contents are constantly compared by a comparator whose output indicates whether the contents of the latches are equal or not equal. If they are equal, the video signal is from a broadcast source. Otherwise, it is a signal from a VCR. In this manner, the comparator constantly determines whether every other time interval is equal to the preceding one.

Occasionally, the above-described circuit could be fooled by a camera change or other noisy input. Thus, to prevent, this the output of the comparator is applied through a low pass filter to a trigger circuit with hysteresis. The low pass filter will not activate the trigger until the output of the comparator has been the same for a selected period of time (about four picture frames), and the trigger changes thresholds after it is triggered because of the hysteresis. Thus, once the trigger is actuated, a significant signal change at the trigger input is required in order to reverse the trigger.

In accordance with another embodiment a microprocessor is used to detect jitter using the same principle as described above except that a larger number of picture frames are used to detect the presence or absence of VCR jitter. In a microprocessor every time interval between the vertical synchronization pulses is measured and a predetermined number of them are saved as counts. The microprocessor then analyzes the saved counts by odd groups and even groups. This alternate analyzation by the microprocessor has the same effect as monitoring only every other time interval as described above.

In the microprocessor version of the invention, filtering is accomplished digitally by the microprocessor. When the microprocessor analyzes the even and odd groups of counts, it ignores the most deviate count in each group. It then compares only the remainder of the counts to determine whether jitter is sufficiently large to indicate a VCR signal source.

BRIEF DESCRIPTION OF THE DRAWINGS

The present invention may best be understood by reference to the following Detailed Description of preferred embodiments when consider in conjunction with the Drawings in which:

FIG. 2 is an alternate embodiment of the identifier using a microprocessor.

DETAILED DESCRIPTION

Figure 1:
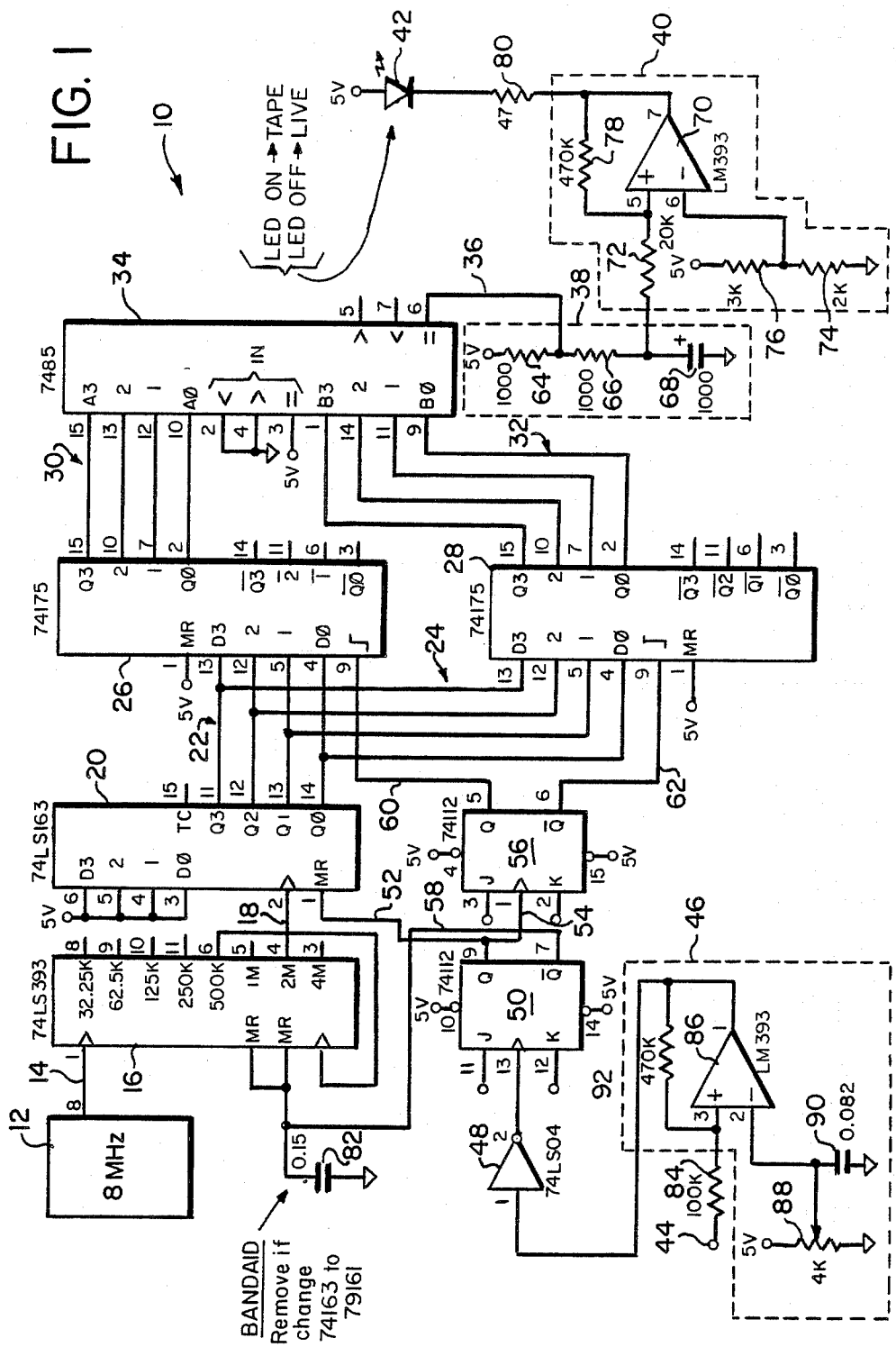
FIG. 1 is a circuit diagram of a TV input source identifier using discrete elements and illustrating one embodiment of the present invention.

Referring now to the Drawings in which like reference characters designate like or corresponding parts throughout the several views, there is shown in FIG. 1 a TV input source identifier 10 that includes a clock 12 that produces an 8 megahertz clock signal. This signal appears on pin 8 and is applied through line 14 to pin 1 of a counter 16, part number 74LS393. A 2 megahertz signal is produced by the counter 16 and applied through pin 4 and line 18 to a pin 2 on a second counter 20 whose function is to count the 2 megahertz pulses and, thus, produce a count corresponding to a time interval. The count is output on lines 22 (pins 11–14) and is received by a latch 26 on pins 4, 5, 12 and 13. The output of counter 20 is also received by a latch 28 on pins 4, 5, 12 and 13. Latches 26 and 28 are both part number 74175 latches. The count appearing on lines 22 is a binary count with a 1 megahertz frequency appearing on pin 14, a 0.5 megahertz frequency on pin 13, a 0.25 megahertz frequency on pin 12 and a 0.125 megahertz frequency appearing on pin 11.

In the case of both latches 26 and 28, their output appears on pins 2, 7, 10 and 15. The output of latch 26 is applied to pins 10, 12, 13 and 15 of a comparator 34, part number 7485, and the output of latch 28 is applied to pins 9, 11, 14 and 1 of the comparator 34. The output of the comparator 34 appears on line 6 and it is applied through line 36 to a low pass filter 38 whose output is applied to a comparator 40. If the contents of the latches 26 and 28 are identical, the output on pin 6 of the comparator 34 will be high. Otherwise, the output on pin 6 will be low. The output of comparator 40 controls an LED 42 so that the LED 42 is on when the output on pin 6 is low, and it is off when the output on pin 6 of comparator 34 is high.

Referring now to the lower left-hand side of the circuit diagram shown in FIG. 1, there is shown circuitry for receiving the vertical synchronization pulses of a television set. The vertical synchronization pulses have been isolated by a conventional synch separator circuit and are applied at junction 44 to a comparator 46. The output of the comparator 46 is applied through an inverter 48 to a flip-flop 50. The non-inverted output of the flip-flop 50 is applied through line 52 to pin 1 of the counter 20 and through line 54 to pin 1 of another flip-flop 56. The inverted output of the flip-flop, appearing on pin 7, is applied through a line 58 to pins 12 and 2 of the counter 16. Also, the non-inverted output of flip-flop 56 appears on pin 5 and is applied through line 60 to pin 9 of the latch 26, and the inverted output of flip-flop 56 appears on pin 6 and is applied through line 62 to pin 9 of latch 28.

In operation, the basic function of the circuit shown in FIG. 1 is to place numbers or counts in latches 26 and 28 that correspond in magnitude to every other time interval between vertical synchronization pulses (alternate time intervals). To produce this count, a clock signal is provided by the clock 12. This 8 megahertz clock signal is applied to counter 16 which functions to divide the frequency by four and produce a 2 megahertz frequency on line 18 and these pulses are counted by the counter 20. The two counters 16 and 20 are controlled by a flip-flop 50 so that the counts appearing counter 20 correspond to every other time interval between vertical synchronization pulses. For example, assume that a vertical synchronization pulse is receiving by flip-flop 50 and that the non-inverted output on pin 9 goes high and the inverted output on pin 7 goes low. A high input is thus applied to counter 16 which causes it to count and a low input is applied to counter 20 which also causes it to count. For the time interval following the first synchronization pulse, both counters 16 and 20 will count. When the second synchronization pulse is received by the flip-flop 50, a low signal will be applied to counter 16 and a high signal will be applied to counter 20 causing them both to clear and, at the same time, the counter 20 will be read by one of latches 26 and 28. Both counters 16 and 20 are held clear until the third synchronization pulse is received, and whereupon both of the counters 16 and 20 will begin counting again. When the fourth synchronization pulse arrives, counter 20 is read again and both counters 16 and 20 are cleared. This procedure repeats so that the counter 20 is constantly counting for the time period of every other time interval and is held clear during the remainder of the time periods between synchronization pulses.

Flip-flop 56 is controlled by the non-inverted output of flip-flop 50 and its function is to control which of latches 26 and 28 will read the counter 20. In a sense the flip-flop 56 is operating at one-half the speed of the flip-flop 50, and the non-inverted output of flip-flop 56 controls latch 26 and its inverted output controls latch 28. When the non-inverted output goes high, latch 26 will read counter 20. When the flip-flop 56 is actuated and the inverted output goes high, latch 28 will read counter 20. In this manner, latches 26 and 28 alternately read counter 20 so that the latch with the oldest count will read the new count from the counter 20. Thus, latches 26 and 28 always contain counts corresponding to every other one of the most recent time intervals between the vertical synchronization pulses. The comparator 34 constantly compares the contents of latches 26 and 28 and, if the contents are equal, then the output on the equals pin 6 of the comparator 34 will go high and will turn off the LED 42. If the contents of latches 26 and 28 are not equal, the equals pin 6 of the comparator 34 will go low and that signal will turn the LED 42 on.

It will be appreciated that the output of the comparator is applied to low pass filter 38 which comprises two 1000 ohm resistors 64 and 66 and a 1000 picofarad capacitor 68 connected in series between a 5 volt power source and common. The input to the filter 38 is applied between the resistors 64 and 66 and the output of the filter is taken between resistor 66 and the capacitor 68. In this construction, the low pass filter will require the signal on line 36 to change and remain the same for about four picture frames before it will pass the changed signal to actuate the comparator 40. Thus, the low pass filter 38 will prevent the LED 42 from flashing on and off if the output on pin 6 is changing rapidly (more than once every four frames). By adjusting the components of the low pass filter 38, one may adjust the time of the delay imposed by the filter.

The comparator 40 which receives the output of the low pass filter 38 functions as trigger with hysteresis. The comparator 40 includes an op amp 70 that is part of a chip LM393, and the input of the op amp 70 is received on pin 5 through a resistor 72 from the filter 38. A reference voltage is applied to pin 6 of the op amp 70 and this reference voltage is created by a 3K ohm resistor 76 and a 2K ohm resistor 74 connected in series between a 5 volt source and common. The reference voltage is taken from the junction between the two resistors. A feedback resistor 78, 470K ohms, is connected between the output of the op amp 70 and the input, on pin 5. This feedback resistor 78 creates hysteresis which means that different voltages are required to turn the trigger 40 on and off. That is, the voltage required to trigger "on" is higher than voltage required to trigger "off".

The output of the trigger 40 is applied through a 47 ohm resistor 80 to an LED 42 that is connected in series with a 5 volt power source. Through the combination of the time delay imposed by the low pass filter 38 and the hysteresis imposed by the trigger 40, a circuit is achieved that will produce steady on and off conditions for the LED 42 even through the output on line 36 may be somewhat noisy and will occasionally provide false signals due to camera changes in a broadcast signal.

Referring again to counter 20, it will be noted that only the lowest order bits are applied on lines 22 as the count for latches 26 and 28. Since the time intervals that are being measured are very nearly the same, the higher order bits of the count will always be equal. Thus, it is necessary only to use the low order bits of the counter 20 when generating the counts in latches 26 and 28 that will be compared.

Referring to the counter 16, it will be noted that a 0.15 microfarad capacitor 82 is also connected to the reset pins 2 and 12 thereof. The purpose of this capacitor 82 is to ensure that the clear signal applied to counter 16 is slightly delayed with respect to the clear signal applied to counter 20 on pin 1. This is necessary since counter 20 has a synchronized clear mode of operation. The capacitor 82 would not be necessary if chips having nonsynchronized clears were used.

Referring to comparator 46 in the lower left side of FIG. 1, it is appreciated that the comparator is of standard design. The synchronization signal applied at pin 44 passes through a 100K ohm resistor 84 to pin 3 of an op amp 86 which is part of an LM393 chip. Pin 2 of the op amp 86 is provided with a reference voltage by a 4K ohm variable resistor 88 which is connected between a 5 volt power source and common. Pin 2 is also connected to common by a 0.082 microfarad capacitor 90. A 470K ohm resistor 92 is connected between the output of op amp 86 and pin 3, its input, to produce hysteresis in the usual fashion. In this manner, a flickering of the input to the inverter 48 is minimized and ordinarily prevented.

In FIG. 1, the circuitry is drawn in a conventional fashion. Pin numbers are located on the outside of the chips adjacent to the pins, and designations or functions are designated within the chip adjacent the pins. A circle on the end of a pin or a line indicates a 5 volt power source and an inverted triangle indicates ground.

Referring now to FIG. 2, there is shown an alternate embodiment of the identifier 10 which utilizes a microprocessor 100 that is preferably part of an MC68HC11 microprocessor which could also be used in many televisions to control tuning. Vertical synchronization pulses are applied through line 102 and a comparator 104 as an input to the microprocessor 100, and a crystal 106 is connected to the microprocessor 100 to provide a four megahertz reference for the internal counter. The MC68HC11 microprocessor has a 16 bit onboard counter that will run at one-half the crystal frequency. Thus, the counter within the microprocessor 100 will run at 2 megahertz. Using this feature, the time of each leading edge of the vertical synchronization pulses can be timed to within 0.5 microseconds.

To achieve the desired function essentially equivalent to that of the circuit shown in FIG. 1, the microprocessor 100 is programmed to provide the appropriate output signals on line 108 to signal either the presence or absence of a sufficient amount of jitter to indicate that the video signal is from a VCR. The basic theory of the program for the microprocessor 100 is to mimic the function of the circuit shown in FIG. 1 except that a greater number of time intervals will be used to increase reliability and filtering will be accomplished digitally by the program. The method executed in the microprocessor begins by recording a count that corresponds to the time interval between each vertical synchronization pulse. From each of these counts, a nominal count is subtracted to produce a scaled count. Preferably, the nominal vertical count is 33367 of a 2 megahertz clock. The scaled counts are converted to 8 bits for easy math and handling and a predetermined number, such as 20, of the scaled counts are saved. Then, the counts are grouped into even and odd groups so that each group contains a scaled count corresponding to every other time interval in the group. Next, averages for odd scaled counts and even scaled counts are determined. However, in determining such averages, the scaled counts that deviate the most from the other counts in the groups are eliminated and not considered in determining the average. After the average has been determined, a total deviation for the counts of each group is determined. Again, in determining the total deviation, the extremes of each group are not considered. The sum of the odd deviations and the even deviations are then compared to a selected threshold and, if the total deviation is greater than the threshold, the output on line 108 indicates that the signal source is a VCR or tape. If the total deviation of both groups is less than the threshold, the output on line 108 indicates that the signal is a broadcast signal.

The above procedure may be implemented in the microprocessor 100 using the pseudo code listed below.

Pseudo Code
1. Get Interrupt_time;
2. Count:=Interrupt_time - Previous_time;
3. Previous_time:=Interrupt_time;
4. Scaled_count:=Convert_8 bit (count-33367);
5. Frame (0):=Scaled_Count;
6a. For index in 20 . . . 1 DO
6b. Frame (index):=Frame (index-1);
6c. End loop;
7. Odd_Sum:=0;
8. Even_Sum:=0;
9a. For index in 1 . . . 10 Do
9b. Odd_Sum:=Odd_Sum+Frame (2 * index-1);
9c. Even_Sum:=Even_Sum+Frame (2 * index);
9d. End loop;
10. Odd_Average:=Odd_Sum/10;
11. Even_Average:=Even_Sum/10;
12. Largest_Odd_Dev:=0;
13. Largest_Even_Dev:=0;
14a. For index in 1 . . . 10 Do
14b. If Abs (Frame (2 * index-1) - Odd_Average>- Largest_Odd Dev
14c. Then Largest_Odd_Dev=Abs (Frame (2 * index-1) - Odd_Average;
14d. Extreme_Odd_No.=Frame (2 * index-1)
14e. End if;
14f. If Abs (Frame (2 * index) - Even_Average)->Largest_Even_Dev
14g. Then Largest_even_Dev:=Abs (Frame (2 * index) - even_average);
14h. Extreme even No=Frame (2 * index)
14i. End if;
15. Adj_odd_ave:=(10 * Odd_Average - Extreme_Odd_No)/9;
16. Adj_even_ave:=(10 * Even_Average - Extreme_Even_No.)/9;
17. Sum_odd_dev:=- largest_odd_dev;
18. Sum_even_dev:=- largest_even_dev;
19a. For index in 1 . . . 10 Do
19b. Sum_odd_dev:=Sum_odd_dev+Abs (Frame (2 * index-1) - Adj_odd_ave);
19c. Sum_even_dev:=Sum_even_dev+Abs (Frame (2 * index) - Adj_even_ave);
20a. If (sum_odd_dev+sum_even_dev)>threshold
20b. Then Put "TAPE";
20c. Else Put "LIVE";
20d. End if:
21. End.

The purpose of steps 1-3 in the pseudo code is to calculate a 16 bit number referred to in the pseudo code as a count which corresponds to the time between each vertical synchronization pulse. In step 4, this 16 bit count is converted to an 8 bit number called a "scaled" count by subtracting from the each count the number 33367. The term "scaled" is used in its broadest sense and it does not necessarily imply a fixed ratio between original values and scaled values. In the two embodiments discussed herein, the scaled count is a remainder produced by a division and a remainder after a subtraction. In these cases there is not a fixed ratio between the count and the scaled count. In steps 5 and 6, the last twenty scaled counts are stored in an array called frame and in steps 9 and 10, an average for all the odd numbers and even numbers stored in frame are determined for odd and even fields. Using the odd average and the even average, the pseudo code in steps 12-14 identifies the extreme odd number and the extreme even number and determines the deviation of the extreme odd number and the extreme even number. To determine the extreme numbers for each group, the difference between each count and the averages are examined. The number corresponding to the greatest absolute value of this difference is stored as the extreme number and the difference is consider the largest deviation.

In steps 15 and 16, the odd and even averages are adjusted to eliminate the influence of the extreme odd number and the extreme even number and these averages are called the adjusted_odd_average and the adjusted_even_average. In steps 17-19, the total deviation for all of the counts of the two groups is determined using the adjusted_odd_average and the adjusted_even_average. However, the largest odd deviation and the largest even deviation are subtracted out of this calculation so that the extreme_even_number and the extreme_odd_number are, again, not considered in determining the total deviation of each group. In step 20, the sums of the deviations in the even and odd groups are themselves summed and compared to a threshold. If this sum is greater than the threshold, then step 20b requires an output signal indicating that the signal source is "tape". Else, step 20c requires the output to indicate a "live" video signal.

In summary, the present invention determines the type of video signal source by looking at jitter. It would be possible, but very difficult, to determine jitter by examining the horizontal synchronization pulses. A typical jitter in a horizontal synchronization signal would be on the order of 5 nanoseconds. Such jitter could be detected, but it would be complicated and expensive. It is preferred in the present invention to examine the vertical synchronization pulses. The horizontal jitter accumulates and is corrected during vertical synchronization. This effect causes errors in the vertical synchronization signal that are much larger than those in the horizontal synchronization signal. For example, for a typical VCR, jitter in the vertical synchronization signal may be on the order of 2 or 3 microseconds. Detecting jitter using the vertical synchronization pulses is thus easily compared to detecting jitter in the horizontal synchronization signal. Probably, the best method and apparatus for detecting this jitter would be through the use of a microprocessor. In the embodiment described herein, the jitter detection could be performed by the microprocessor that normally is used to tune the television receiver. Thus, except for the programming, the jitter detection function would be free. However, it would also be possible to build a discrete circuit such as disclosed in FIG. 1 for detecting jitter and judging the results.

Although particular embodiments have been described in the foregoing Detailed Description, it will be understood that the invention is capable of numerous modifications, rearrangements and substitutions of parts without departing from the scope of the invention as defined by the appended claims.

What is claimed is:

1. An apparatus for analyzing a video signal having at least one synchronization signal that includes a plurality of synchronization pulses and for determining whether the video signal is from a local video playing device or a broadcast signal source, comprising:

means for receiving the video signal and for generating timing data corresponding to the synchronization signal of the video signal for at least first and second time intervals between the synchronization pulses;

means for comparing the timing data of at least the first time interval to the timing data of at least the second time interval and producing a comparison signal that corresponds to the amount of jitter in said video signal; and judgment means responsive to said comparison signal for producing a local signal when said comparison signal is within a first predetermined range to indicate that the video signal is from a local video playing device and for generating a broadcast signal when said comparison signal is within a second predetermined range to indicate that the video signal is from a broadcast signal source.

2. The apparatus of claim 1 wherein said means for receiving and generating further comprise clock means for measuring every other time interval between synchronization pulses.

3. The apparatus of claim 1 wherein said judgment means further comprise filter means for receiving and filtering the comparison signal and for distinguishing selected frequencies of said comparison signal.

4. The apparatus of claim 1 wherein said means for receiving and generating further comprise clock means for determining the time intervals between selected synchronization pulses and for generating time counts corresponding in magnitude to said time intervals.

5. The apparatus of claim 4 wherein said means for comparing further comprise:

means for storing at least two of said time counts; and a comparator for comparing the magnitude of said two time counts and for generating the comparison signal to correspond to the comparison of said two counts.

6. The apparatus of claim 1 wherein said means for receiving and generating further comprise:

clock means for determining the time intervals between said synchronization pulses and for generating digital time counts corresponding in magnitude to separate ones of said time intervals;

subtraction means for subtracting a preselected nominal count from each of said time counts to produce a scaled count; and means for storing a selected number of said scaled counts to constitute said timing data.

7. The apparatus of claim 6 wherein said means for comparing further comprise:

means for grouping said digital time counts into at least first and second groups and comparing said digital time counts of each group separately from the other group.

8. The apparatus of claim 5, wherein said means for comparing further comprise means for determining and ignoring a time count of each group that has the greatest deviation from the average of the time counts of the same group.

9. An apparatus for analyzing a video signal having a vertical synchronization signal that includes a plurality of vertical synchronization pulses and for determining whether the video signal is from a local video tape player or a broadcast signal source, comprising:
- means for measuring and recording the time intervals between said vertical synchronization pulses;
- means for scaling the magnitude of each of said recorded time intervals to produce scaled times for each recorded time interval;
- means for saving a predetermined number of the scaled times;
- comparison means for comparing the scaled times to others of the scaled times and producing a comparison signal corresponding to the magnitude of jitter in the video signal; and
- judgment means responsive to the comparison signal for producing a local signal when said comparison signal is within a first range indicating that the video signal is from the local video tape player and for producing a broadcast signal when said comparison signal is within a second range indicating that the video signal is from a broadcast signal source.

10. The apparatus of claim 9 wherein said comparison and judgment means further comprise:
- means for calculating an odd average for the odd ones of the saved scaled times;
- means for calculating an even average for the even ones of the saved even scaled times;
- means for identifying and defining as odd extremes a selected number of odd scaled times having the largest absolute deviations from the odd average;
- means for identifying a selected number of even scaled times having the largest absolute deviations from the even average;
- means for calculating an adjusted odd average and an adjusted even average of said odd and even scaled times, respectively, wherein the odd and even extremes are removed from the adjusted averages;
- means for summing the absolute deviations of the odd scaled times from the adjusted odd average and for removing the effect of the odd extremes from the sum to produce an adjusted odd sum;
- means for summing the absolute deviations of the even scaled times from the adjusted even average and for removing the effect of the even extremes from the sum to produce an adjusted even sum; and
- means for judging the adjusted odd sum and the adjusted even sum to determine whether the video signal is from a local video tape player or a broadcast signal source.

* * * * *